United States Patent
Barton et al.

(10) Patent No.: US 11,813,713 B2
(45) Date of Patent: Nov. 14, 2023

(54) CHEMICAL MECHANICAL POLISHING PAD AND POLISHING METHOD

(71) Applicant: Rohm and Haas Electronic Materials CMP Holdings, Inc., Newark, DE (US)

(72) Inventors: Bryan E. Barton, Lincoln University, PA (US); Teresa Brugarolas Brufau, Philadelphia, PA (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 254 days.

(21) Appl. No.: 17/154,772

(22) Filed: Jan. 21, 2021

(65) Prior Publication Data
US 2022/0226957 A1 Jul. 21, 2022

(51) Int. Cl.
*B24B 37/22* (2012.01)
*C09G 1/04* (2006.01)
*B24B 37/24* (2012.01)
*C09G 1/02* (2006.01)

(52) U.S. Cl.
CPC .............. *B24B 37/22* (2013.01); *B24B 37/24* (2013.01); *C09G 1/02* (2013.01); *C09G 1/04* (2013.01)

(58) Field of Classification Search
CPC ......... B24B 37/20; B24B 37/22; B24B 37/24; B24B 37/245; B24B 37/26; B24D 3/20; B24D 3/22; B24D 3/26; B24D 3/28; B24D 3/285; B24D 3/30; B24D 3/32; B24D 18/0009; B24D 11/001; C08G 18/3206; C08G 18/3868; C08G 18/4854; C08G 18/6685; C08G 18/10; C08G 18/3275; C08G 18/4825; C08G 18/667; C08G 18/73
USPC ........................................................ 451/526
See application file for complete search history.

(56) References Cited

U.S. PATENT DOCUMENTS

| | | |
|---|---|---|
| 2009/0062414 A1 | 3/2009 | Huang et al. |
| 2013/0298473 A1* | 11/2013 | Wank ........................ C09C 1/02 51/298 |
| 2015/0375361 A1* | 12/2015 | Qian ..................... B24B 53/017 216/53 |
| 2018/0071888 A1* | 3/2018 | Weis ..................... B24B 53/017 |
| 2018/0148537 A1 | 5/2018 | Barton et al. |
| 2018/0207770 A1* | 7/2018 | Tolles ................... B24B 37/205 |
| 2020/0391344 A1* | 12/2020 | Joeng ................... C08G 18/758 |
| 2021/0008687 A1* | 1/2021 | Ma .......................... B32B 27/40 |

FOREIGN PATENT DOCUMENTS

JP 5939963 B2 * 6/2016 ............. G03F 7/038

OTHER PUBLICATIONS

English translation of JP 5939963B2 (Year: 2016).*

* cited by examiner

*Primary Examiner* — Joel D Crandall
*Assistant Examiner* — Sukwoo James Chang
(74) *Attorney, Agent, or Firm* — John J. Piskorski; Simon L. Xu

(57) ABSTRACT

CMP polishing pads or layers made from a polyurethane reaction product of a reaction mixture comprising (i) a liquid aromatic isocyanate component comprising one or more aromatic diisocyanates or a linear aromatic isocyanate-terminated urethane prepolymer, and (ii) a liquid polyol component comprising a) one or more polymeric polyols, b) from 12 to 40 wt. %, based on the total weight of the liquid polyol component, of a curative mixture of one or more small chain difunctional polyols having from 2 to 9 carbon atoms, a liquid aromatic diamine, wherein the mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer ranges from 1.0:1.0 to 1.15:1.0. The polishing layer is capable of forming a total texture depth, as measured by Sdr, a parameter defined by the ISO 25178 standard, upon treatment by a surface conditioning disk, in the range of from 0 to 0.4. Also disclosed is a chemical mechanical polishing method using the polishing pad together with a ceria abrasive slurry.

10 Claims, No Drawings

CHEMICAL MECHANICAL POLISHING PAD AND POLISHING METHOD

The present invention relates generally to the field of chemical mechanical polishing (CMP) of advanced semiconductor devices. More particularly, the present invention is directed to improved formulations for making CMP pads, and a method of chemical mechanical polishing of advanced semiconductor devices.

In the fabrication of integrated circuits and other electronic devices, multiple layers of conducting, semiconducting and dielectric materials are deposited on or removed from a surface of a semiconductor wafer. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the wafer becomes non-planar. Because subsequent semiconductor processing (e.g., metallization) requires the wafer to have a flat surface, the wafer needs to be planarized. Planarization is useful in removing undesired surface topography and surface defects, such as rough surfaces, agglomerated materials, crystal lattice damage, scratches, and contaminated layers or materials.

Chemical mechanical planarization, or chemical mechanical polishing (CMP), is a common technique used to planarize substrates, such as semiconductor wafers. In conventional CMP, a wafer is mounted on a carrier assembly and positioned in contact with a polishing pad in a CMP apparatus. The carrier assembly provides a controllable pressure to the wafer, pressing it against the polishing pad. The pad is moved (e.g., rotated) relative to the wafer by an external driving force. Simultaneously therewith, a chemical composition ("slurry") or other polishing solution is provided between the wafer and the polishing pad. Thus, the wafer surface is polished and made planar by the chemical and mechanical action of the pad surface and slurry.

In addition to the contact force between a pad and slurry particles, surface forces also act between the wafer and the slurry particles, and impact the CMP material removal rate.

U.S. patent publication no. 2009/0062414A1, to Huang et al. discloses CMP polishing pads made by frothing an aliphatic isocyanate containing urethane prepolymer with an inert gas in the presence of a polysiloxane-polyalkyleneoxide surfactant and curing the froth with a curative that includes an aromatic diamine and a triol. The resulting CMP polishing pad has improved damping performance and a density of from 0.6 to 1.0 g/cm$^3$. However, the resulting polishing pad fails to provide acceptable removal rates in polishing.

U.S. patent publication no. 20180148537, to Barton et al. discloses CMP polishing pads made by reacting a liquid aromatic isocyanate compound with a liquid polyol using a curative of one or more polyamine or diamine. However, this reference fails to recognize the criticality of the surface texture of polishing pads.

A need exists for an improved chemical mechanical polishing pad having higher CMP planarization performance and productivity. The present invention satisfies this need by providing improved formulations for making CMP pads, and a method of pairing the improved CMP pads with a ceria slurry to improve polishing performance.

STATEMENT OF THE INVENTION

1. In accordance with the present invention, chemical mechanical polishing (CMP polishing) pads for polishing a substrate chosen from at least one of a magnetic substrate, an optical substrate and a semiconductor substrate, the CMP polishing pad comprising a polishing layer adapted for polishing the substrate, the polishing layer being a polyurethane, the polyurethane is a product of a reaction mixture comprising (i) a liquid aromatic isocyanate component comprising one or more aromatic diisocyanates or a linear aromatic isocyanate-terminated urethane prepolymer having an unreacted isocyanate (NCO) concentration of from 20 to 40 wt. %, or, preferably, from 18 to 34 wt. %, based on the total solids weight of the liquid aromatic isocyanate component, preferably a linear methylene diphenyl diisocyanate (MDI) prepolymer, and (ii) a liquid polyol component comprising a) one or more polymeric polyols, such as polytetramethylene glycol (PTMEG), polypropylene glycol (PPG), a polyol having from 5 to 7 hydroxyl groups, such as a hexafunctional polyol, or mixtures thereof, and b) from 12 to 40 wt. %, or, preferably, from 15 to 25 wt. %, based on the total weight of the liquid polyol component, of a curative mixture of one or more small chain difunctional polyols having from 2 to 9 carbon atoms, such as, for example, ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol and mixtures thereof, or, preferably, ethylene glycol, propylene glycol, diethylene glycol, dipropylene glycol and triethylene glycol, and a liquid aromatic diamine which is a liquid under ambient conditions, for example, any chosen from dimethylthio-toluene diamines, diethyl toluene diamines; tert-butyl toluene diamines, such as 5-tert-butyl-2,4- or 3-tert-butyl-2,6-toluenediamine; chlorotoluenediamines; and N,N'-dialkylaminodiphenylmethane and mixtures thereof, or, preferably, chlorotoluenediamines or dimethylthio-toluene diamines, diethyltoluenediamine (DETDA) and N,N'-dialkylaminodiphenylmethane, wherein the mole ratio of liquid aromatic diamine to the total moles of small chain difunctional polyols and liquid aromatic diamine ranges from 15:85 to 50:50, or, preferably, from 23:77 to 35:65, and wherein the mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer ranges from 1.0:1.0 to 1.15:1.0, the reaction mixture comprises 48 to 68 wt. %, or, preferably, from 58 to 63 wt. % of hard segment materials, based on the total weight of the reaction mixture, the CMP polishing layer has a hardness in the range of from 54 Shore A (2 Second) to 72 Shore D (2 second), or, preferably, from 59 Shore A (2 second) to 54 Shore D (2 second), and a density of from 0.45 to 0.99 g/mL, or, preferably, from 0.60 to 0.85 g/mL, and, optionally, wherein the polishing layer is capable of forming a total texture depth, as measured by Sdr, a parameter defined by the ISO 25178 standard, upon treatment by a surface conditioning disk, in the range of from 0 to 0.4, or, preferably, in the range of from 0 to 0.3, or, more preferably, in the range of from 0.1 to 0.3.

2. In accordance with the present invention, organic solvent free reaction mixtures for forming a chemical mechanical polishing (CMP polishing) layer as in item 1, above, wherein the (i) liquid aromatic isocyanate component comprises a liquid aromatic isocyanate component chosen from methylene diphenyl diisocyanate (MDI); toluene diisocyanate (TDI); napthalene diisocyanate (NDI); paraphenylene diisocyanate (PPDI); or o-toluidine diisocyanate (TODD); a modified diphenylmethane diisocyanate, such as a carbodiimide-modified diphenylmethane diisocyanate, an allophanate-modified diphenylmethane diisocyanate, a biuret-modified diphenylmethane diisocyanate; a linear isocyanate-terminated urethane prepolymer having a hard segment weight fraction of 84 to 100 wt. % or, preferably, from 90 to 100 wt. %, or, more preferably, MDI or a linear isocyanate-terminated urethane prepolymer of MDI or an MDI dimer with one or more isocyanate extenders chosen from ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol and mixtures thereof.

3. In accordance with the present invention, organic solvent free reaction mixtures for forming a chemical mechanical polishing (CMP polishing) layer as in any one of items 1 or 2, above, wherein the ii)b) curative mixture comprises the one or more small chain difunctional polyols having from 2 to 9 carbon atoms and a liquid aromatic diamine chosen from dimethylthio-toluene diamines, a mixture of the isomer 2,4-diamino-3,5-dimethylthiotoluene; 3,5-dimethylthio-2,4-toluenediamine; diethyl toluene diamines; tert-butyl toluene diamines, such as 5-tert-butyl-2,4- or 3-tert-butyl-2,6-toluenediamine; chlorotoluenediamines; and N,N'-dialkylaminodiphenylmethane and mixtures thereof, or, preferably, chlorotoluenediamines or dimethylthio-toluene diamines, a mixture of the isomers 2,4-diamino-3,5-dimethylthiotoluene and 3,5-dimethylthio-2,4-toluenediamine diethyltoluenediamine (DETDA) and N,N'-dialkylaminodiphenylmethane.

4. In accordance with the present invention, organic solvent free reaction mixtures for forming a chemical mechanical polishing (CMP polishing) layer as in any one of items 1, 2, or 3, above, wherein, the stoichiometric ratio of the sum of the total moles of amine ($NH_2$) groups and the total moles of hydroxyl (OH) groups in the reaction mixture to the total moles of unreacted isocyanate (NCO) groups in the reaction mixture ranges from 1.0:1.0 to 1.15:1.0, or, preferably, from 1.0:1.0 to 1.1:1.0.

5. In accordance with the chemical mechanical polishing pad of present invention as in any one of items 1, 2, 3, or 4, above, wherein the polishing pad or polishing layer has a density of from 0.45 to 0.99 g/mL or, preferably, from 0.60 to 0.85 g/mL.

6. In accordance with the chemical mechanical polishing pad of the present invention as in any one of items 1, 2, 3, 4 or 5, above, the polishing pad further comprising a subpad or backing layer such as a polymer impregnated non-woven, or polymer sheet, onto bottom side of a polishing layer so that the polishing layer forms the top of the polishing pad.

7. In yet another aspect, the present invention provides methods for making chemical mechanical (CMP) polishing pads having a polishing layer adapted for polishing a substrate comprising providing the two component reaction mixture as in any one of items 1, 2, 3, 4, 5, or 6, above, mixing the (i) liquid aromatic isocyanate component and the (ii) liquid polyol component, such as, for example, in a static mixer or an impingement mixer, and applying the reaction mixture as one component to an open mold surface, preferably, having a male topography that forms a female groove pattern in the top surface of a CMP polishing pad or layer, curing the reaction mixture at from ambient temperature to 130° C. to form a molded polyurethane reaction product, for example, initially curing at from ambient temperature to 130° C. for a period of from 1 to 30 minutes, or, preferably, from 30 seconds to 5 minutes, removing the polyurethane reaction product from the mold, and, then, finally curing at a temperature from 60 to 130° C. for a period of 1 minutes to 18 hours, or preferably from 5 min to 60 minutes to form the CMP polishing pad or layer.

8. In accordance with the methods of the present invention as in item 7, above, wherein the forming of the polishing pad further comprises stacking or spraying a subpad layer, such as a polymer impregnated non-woven, or porous or non-porous polymer sheet, onto bottom side of a polishing layer so that the polishing layer forms the top surface of the polishing pad.

9. In accordance with the methods of the present invention as in any one of items 7 or 8, above, wherein the methods form the surface of the CMP polishing pad directly in the mold.

10. In accordance with the methods of the present invention as in any one of items 7, 8 or 9, above, wherein the applying the reaction mixture as one component comprises overspraying the mold, followed by the curing to form a polyurethane reaction product, removing the polyurethane reaction product from the mold and then punching or cutting the perimeter of the polyurethane reaction product to the desired diameter of the CMP polishing pad.

11. In yet still another aspect, the present invention provides methods of polishing a substrate, comprising: providing a substrate selected from at least one of a magnetic substrate, an optical substrate and a semiconductor substrate, such as a dielectric or silicon oxide containing; providing a polishing slurry comprising water and a ceria abrasive; providing a chemical mechanical (CMP) polishing pad according to any one of items 1 to 6 above; creating a dynamic motion between the polishing surface and the substrate to polish a surface of the substrate; and dispensing the polishing slurry onto the chemical mechanical polishing pad at or near the interface between the polishing surface and the substrate.

Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

Unless otherwise indicated, conditions of temperature and pressure are ambient temperature and standard pressure. All ranges recited are inclusive and combinable.

Unless otherwise indicated, any term containing parentheses refers, alternatively, to the whole term as if no parentheses were present and the term without them, and combinations of each alternative. Thus, the term "(poly) isocyanate" refers to isocyanate, polyisocyanate, or mixtures thereof.

For purposes of this specification, the reaction mixtures are expressed in wt. %, unless specifically noted otherwise.

All ranges are inclusive and combinable. For example, the term "a range of 50 to 3000 cPs, or 100 or more cPs" would include each of 50 to 100 cPs, 50 to 3000 cPs and 100 to 3000 cPs.

As used herein, the term "ASTM" refers to publications of ASTM International, West Conshohocken, PA.

As used herein, the term "average number of isocyanate groups" means the weighted average of the number of isocyanate groups in a mixture of aromatic isocyanate compounds. For example, a 50:50 wt. % mix of MDI (2 NCO groups) and an isocyanurate of MDI (considered as having 3 NCO groups) has an average of 2.5 isocyanate groups.

As used herein, the term "hard segment" of a polyurethane reaction product or a raw material from the (ii) liquid polyol component and (i) liquid aromatic isocyanate component refers to that portion of the indicated reaction mixture which comprises any diol, glycol, diglycol, diamine, or triamine, diisocyanate, triisocyanate, or reaction product thereof. The "hard segment" thus excludes polyethers or polyglycols, such as polyethylene glycols or polypropylene glycols, or polyoxyethylenes having three or more ether groups.

As used herein, the term "microelements other than those formed by gas, water or $CO_2$-amine adduct" means microelements chosen from hollow core polymeric materials, such as polymeric microspheres, liquid filled hollow core polymeric materials, such as fluid-filled polymeric microspheres, and fillers, such as boron nitride. Pores formed in the CMP polishing layer by gas or blowing agents that solely form gases, such as $CO_2$-amine adducts, are not considered microelements.

As used herein, the term "polyisocyanate" means any isocyanate group containing molecule containing two or more isocyanate groups.

As used herein, the term "polyurethanes" refers to polymerization products from difunctional or polyfunctional isocyanates, e.g. polyetherureas, polyisocyanurates, polyurethanes, polyureas, polyurethaneureas, copolymers thereof and mixtures thereof.

As used herein, the term "reaction mixture" includes any non-reactive additives, such as microelements and any additives to lower the hardness of a polyurethane reaction product in the CMP polishing pad according to ASTM D2240-15 (2015).

As used herein, the term "stoichiometry" of a reaction mixture refers to the ratio of molar equivalents of (free OH+free $NH_2$ groups) to free NCO groups in the reaction mixture.

As used herein, the term "SG" or "specific gravity" refers to the weight/volume ratio of a rectangular cut out of a polishing pad or layer in accordance with the present invention.

As used herein, the term "Shore D hardness" is the 2 second hardness of a given CMP polishing as measured according to ASTM D2240-15 (2015), "Standard Test Method for Rubber Property—Durometer Hardness". Hardness was measured on a Rex Hybrid hardness tester (Rex Gauge Company, Inc., Buffalo Grove, IL), equipped with a D probe. Six samples were stacked and shuffled for each hardness measurement; and each pad tested was conditioned by placing it in 50 percent relative humidity for five days at 23° C. before testing and using methodology outlined in ASTM D2240-15 (2015) to improve the repeatability of the hardness tests. In the present invention, the Shore D hardness of the polyurethane reaction product of the polishing layer or pad includes the Shore D hardness of that reaction including any additive to increase hardness. The term "Shore A" hardness refers to the same 2 second hardness measure with a larger A probe for softer materials.

As used herein, the term "solids" refers to any materials that remain in the polyurethane reaction product of the present invention; thus, solids include reactive liquids and non-volatile additives and liquids that do not volatilize upon cure. Solids exclude water and volatile solvents.

As used herein, unless otherwise indicated, the term "substantially water free" means that a given composition has no added water and that the materials going into the composition have no added water. A reaction mixture that is "substantially water free" can comprise water that is present in the raw materials, in the range of from 50 to 2000 ppm or, preferably, from 50 to 1000 ppm, or can comprise reaction water formed in a condensation reaction or vapor from ambient moisture where the reaction mixture is in use.

As used herein, unless otherwise indicated, the term "organic solvent free" means that the composition is free of any added organic solvents, and, preferably, free of any organic solvents.

As used herein, unless otherwise indicated, the term "viscosity" refers to the viscosity of a given material in neat form (100%) at a given temperature as measured using a rheometer, set at an oscillatory shear rate sweep from 0.1-100 rad/sec in a 50 mm parallel plate geometry with a 100 µm gap.

As used herein, unless otherwise indicated, the term "wt. % NCO" refers to the amount of unreacted or free isocyanate groups a given isocyanate or isocyanate-terminated urethane prepolymer composition.

As used herein, the term "wt. %" stands for weight percent.

In accordance with the present invention, the present inventors have discovered that certain CMP polishing pads having a polishing layer from reaction mixtures where the mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer ranges from 1.0:1.0 to 1.15:1.0 can form a polishing surface with desirable total texture depths, upon treatment by a surface conditioning disk, to provide a porous CMP polishing pad that gives an attractive removal rate. In particular, an uncompressed dry surface texture parameter is defined as Sdr total texture depth. Sdr corresponds to the developed interfacial area ratio (ISO 25178) which is a hybrid parameter that characterizes the complexity of the surface texture. Sdr represents the developed surface area as compared to the projected area, and is expressed as the value over 100%. A perfectly smooth surface will have a Sdr value of 0%. The desirable range of Sdr is from 0 to 0.4, or 0 to 40%, for polishing pads. Polyurethane products from reaction mixtures having a higher molar content of polyols often suffers decreased elongation at break, therefore the reaction mixtures of the present disclosure can afford a highly desirable total texture depth is surprising. Furthermore, the present inventors have surprisingly discovered that the combination of the polishing pads of the present disclosure with a ceria abrasive slurry provided superior polishing results when compared to using a silica abrasive slurry.

The reaction mixture of the present invention can comprise a very rapid curing composition wherein the (i) liquid aromatic isocyanate component and the (ii) liquid polyol component can gel in a gel time as short as 15 seconds at 65° C. The reaction has to be slow enough that the reaction mixture can be mixed in a static or impingement mixer. The only limit on gel time is that the reaction mixture must react slowly enough so as not to clog the mix head in which it is mixed, and to adequately fill a mold when applying it to the mold surface.

The hard segment of the reaction mixture ensures good mechanical properties. The hard segment can be 56.25 to 68 wt. % of the reaction mixture and can comprise part of both the liquid polyol component and the liquid aromatic isocyanate component.

As part of the hard segment of the reaction mixture, a (i) liquid aromatic isocyanate component is preferably methylene diphenyl diisocyanate (MDI), which is less toxic compared to toluene diisocyanate (TDI). The liquid aromatic isocyanate component can comprise a linear isocyanate-terminated urethane prepolymer formed from short chain diols like glycols and diglycols or, preferably, monoethylene glycol (MEG), dipropylene glycol (DPG), or tripropylene glycol (TPG).

Preferably, the (i) liquid aromatic isocyanate component of the present invention contains only up to 5 wt. % of aliphatic isocyanate, or, more preferably, up to 1 wt. % thereof, based on the total weight of the liquid aromatic isocyanate.

The soft segment of the reaction mixture can comprise as polymeric polyols a) one or more difunctional polyether polyols in the amount of up to 88 wt. % of the (ii) liquid polyol component. Suitable soft polyols are PTMEG and PPG. Available examples of PTMEG containing polyols are as follows: Terathane™ 2900, 2000, 1800, 1400, 1000, 650 and 250 from Invista, Wichita, KS; Polymeg™ 2900, 2000, 1000, 650 from Lyondell Chemicals, Limerick, PA; Poly-THF™ 650, 1000, 2000 from BASF Corporation, Florham Park, NJ Available examples of PPG containing polyols are as follows: Arcol™ PPG-425, 725, 1000, 1025, 2000, 2025, 3025 and 4000 from Covestro, Pittsburgh, PA; Voranol™, Voralux™, and Specflex™ product lines from Dow, Midland, MI; Multranol™, Ultracel™, Desmophen™ or Acclaim™ Polyol 12200, 8200, 6300, 4200, 2200, each from Covestro (Leverkusen, DE).

The soft segment of the reaction mixture may comprise as polymeric polyols a) one or more polyol having a polyether backbone and having from 5 to 7, preferably, 6 hydroxyl groups per molecule. Preferably, the soft segment of the reaction mixture comprises as polymeric polyols a) a mixture of one or more polyol having a polyether backbone and having from 5 to 7, preferably, 6 hydroxyl groups per molecule and a difunctional polyether polyol, or, more preferably, a mixture wherein the polyol having a polyether backbone and having from 5 to 7, preferably, 6 hydroxyl groups comprises up to 20 wt. % of the total liquid polyol component (ii).

Suitable polyols having a polyether backbone and having from 5 to 7 hydroxyl groups per molecule are available as a VORANOL™ 202 Polyol (Dow) having 5 hydroxyl groups, a number average molecular weight of 590 and a hydroxyl number of 475 mg KOH/g, a MULTRANOL™ 9185 polyol (Dow) having 6 hydroxyl groups, a number average molecular weight of 3,366 and a hydroxyl number of 100 mg KOH/g, or a VORANOL™ 4053 polyol (Dow) having an average of 6.9 hydroxyl groups, a number average molecular weight of 12,420 and a hydroxyl number of 31 mg KOH/g.

The stoichiometry of the reaction mixture of the present invention ranges from (NH+OH):NCO 1.0:1.0 to 1.15:1.0. If stoichiometry ranges above the upper limit, the polyurethane product suffers decreased elongation at break. For purpose of this specification, stoichiometry represents mole ratio of amine and hydroxyl groups to isocyanates.

The curative mixture of the present invention is a liquid comprising one or more liquid aromatic diamine and one or more small chain difunctional polyols having from 2 to 9 carbon atoms. Suitable small chain difunctional polyols having from 2 to 9 carbon atoms can be ethylene glycol, butanediol (BDO), dipropylene glycol (DPG), diethylene glycol (DEG), triethylene glycol (TEG) and mixtures thereof. However, the amount of the one or more small chain difunctional polyols having from 2 to 9 carbon atoms in the curative mixture ranges at least 15 mole % of the curative mixture. If the amount of the liquid aromatic diamine goes above 85 mole %, the resulting CMP polishing layer or pad will be hard but does not provide the desirable PE and defectivity improvement.

The hard segment of the reaction mixture of the present invention ranges above 56.25 wt. % or, preferably, at least 60 wt. % of the total reaction mixture to retain adequate tensile properties, such as modulus and adequate hardness for use as hard top pads that exhibit a high PE.

The liquid reaction mixtures of the present invention enable the provision of CMP polishing pads from methods of spraying a reaction mixture onto an open mold and allowing it to cure. The two-component polyurethane forming reaction mixture of the present invention is liquid and can be mixed in a static mixer or an impingement mixer and sprayed to form a CMP polishing pad.

The chemical mechanical polishing pads of the present invention comprise a polishing layer which is a homogenous dispersion of a porous polyurethane. Homogeneity is important in achieving consistent polishing pad performance. Accordingly, the reaction mixture of the present invention is chosen so that the resulting pad morphology is stable and easily reproducible. For example, it is often important to control additives such as anti-oxidizing agents, and impurities such as water for consistent manufacturing. Because water reacts with isocyanate to form gaseous carbon dioxide and a weak reaction product relative to urethanes generally, the water concentration can affect the concentration of carbon dioxide bubbles that form pores in the polymeric matrix as well as the overall consistency of the polyurethane reaction product. Isocyanate reaction with adventitious water also reduces the available isocyanate for reacting with chain extender, so changing the stoichiometry along with level of crosslinking (if there is an excess of isocyanate groups) and tends to lower resulting polymer molecular weight. To reduce the variability of water's impact to the polyurethane, the water content in the raw materials in monitored and adjusted to a specific value, from 0 ppm to 1000 ppm; preferably from 50 ppm to 500 ppm.

Preferably, to maintain the stability of the pore structure in the reaction mixture and in the porous polyurethane that makes up the CMP polishing layer or pad of the present invention, the (ii) liquid polyol component comprises up to 2.0 wt. % or, preferably, from 0.1 to 1 wt. %, based on the total solids weight of the reaction mixture, of a nonionic surfactant, preferably, an organopolysiloxane-co-polyether surfactant.

Preferably, to increase the reactivity of the (i) liquid polyol component with the liquid aromatic isocyanate component, a catalyst may be used. Suitable catalysts include any known catalysts to those skilled in the art, for example, oleic acid, azelaic acid, dibutyltindilaurate, tin octoate, bismuth octoate, 1,8-diazabicyclo[5.4.0]undec-7-ene (DBU), tertiary amine catalysts, such as Dabco™ TMR catalyst (Air Products, Allentown, PA), triethylenediamines, such as DABCO™ 33 LV catalyst (Air Products), and mixtures of the above.

The reaction mixture of the present invention is substantially free of water and is free of added organic solvents.

The specific gravity of the resulting CMP polishing pad ranges from 0.9 down to 0.45, preferably. As porosity increases, the bulk properties of the CMP polishing pad diminish, removal rate (RR) goes up; however, in a hard and porous CMP polishing pad planarization efficiency (PE) and defectivity properties are not expected to improve with increased hardness or hard segment material weight fraction.

Porosity is introduced into the pad by spraying and the resulting tensile modulus of the pad is a function of both the intrinsic polymer tensile modulus and the porosity, and increasing porosity acts to reduce the bulk modulus. Typical densities acquired on a two-component spray manufacture platform range from 0.45 g/mL to 0.99 g/mL, and more typically 0.6 g/mL to 0.8 g/mL.

Polishing pad density is as measured according to ASTM D1622-08 (2008). Density is the same as specific gravity.

The CMP polishing pads of the present invention are formed by a spray application method which enables higher throughput and lower cost. Preferably, the target or substrate in the methods of the present invention is a mold wherein the produced CMP polishing pad will have groove pattern directly incorporated in the mold.

The CMP polishing pads of the invention are efficacious for interlayer dielectric (ILD) and inorganic oxide polishing. For purposes of the specification, the removal rate refers to the removal rate as expressed in A/min.

The chemical mechanical polishing pads of the present invention can comprise just a polishing layer of the polyurethane reaction product or the polishing layer stacked on a subpad or sub layer. The polishing pad or, in the case of stacked pads, the polishing layer of the polishing pad of the present invention is useful in both porous and non-porous (or unfilled) configurations.

Preferably, the CMP polishing layer used in the chemical mechanical polishing pad of the present invention has an average thickness of from 500 to 3750 microns (20 to 150 mils), or, more preferably, from 750 to 3150 microns (30 to 125 mils), or, still more preferably, from 1000 to 3000 microns (40 to 120 mils), or, most preferably, from 1250 to 2500 microns (50 to 100 mils).

The chemical mechanical polishing pad of the present invention optionally further comprises at least one additional layer interfaced with the polishing layer. Preferably, the chemical mechanical polishing pad optionally further comprises a compressible subpad or base layer adhered to the polishing layer. The compressible base layer preferably improves conformance of the polishing layer to the surface of the substrate being polished.

The CMP polishing layer of the chemical mechanical polishing pad of the present invention has a polishing surface adapted for polishing the substrate. Preferably, the polishing surface has macrotexture selected from at least one of perforations and grooves. Perforations can extend from the polishing surface part way or all the way through the thickness of the polishing layer.

Preferably, grooves are arranged on the polishing surface such that upon rotation of the chemical mechanical polishing pad during polishing, at least one groove sweeps over the surface of the substrate being polished.

Preferably, the CMP polishing layer of the chemical mechanical polishing pad of the present invention has a polishing surface adapted for polishing the substrate, wherein the polishing surface has a macrotexture comprising a groove pattern formed therein and chosen from curved grooves, linear grooves, perforations and combinations thereof. Preferably, the groove pattern comprises a plurality of grooves. More preferably, the groove pattern is selected from a groove design, such as one selected from the group consisting of concentric grooves (which may be circular or spiral), curved grooves, linear grooves, cross hatch grooves (e.g., arranged as an X-Y grid across the pad surface), other regular designs (e.g., hexagons, triangles), tire tread type patterns, radial, irregular designs (e.g., fractal patterns), and combinations thereof. More preferably, the groove design is selected from the group consisting of random grooves, concentric grooves, spiral grooves, cross-hatched grooves, X-Y grid grooves, hexagonal grooves, triangular grooves, fractal grooves and combinations thereof. The groove profile is preferably selected from rectangular with straight side walls or the groove cross section may be "V" shaped, "U" shaped, saw-tooth, and combinations thereof.

In accordance with the methods of making CMP polishing pads in accordance with the present invention, chemical mechanical polishing pads can be molded with a macrotexture or groove pattern in their polishing surface to promote slurry flow and to remove polishing debris from the pad-wafer interface. Such grooves may be formed in the polishing surface of the polishing pad from the shape of the mold surface, i.e. where the mold has a female topographic version of the macrotexture.

The chemical mechanical polishing pad of the present invention can be used for polishing a substrate selected from at least one of a magnetic substrate, an optical substrate and a semiconductor substrate.

Preferably, the method of polishing a substrate of the present invention, comprises: providing a substrate selected from at least one of a magnetic substrate, an optical substrate and a semiconductor substrate (preferably a semiconductor substrate, such as a semiconductor wafer); providing a chemical mechanical polishing pad according to the present invention; creating dynamic contact between a polishing surface of the polishing layer and the substrate to polish a surface of the substrate; and, conditioning of the polishing surface with an abrasive conditioner.

Conditioning the polishing pad comprises bringing a conditioning disk into contact with the polishing surface either during intermittent breaks in the CMP process when polishing is paused ("ex situ"), or while the CMP process is underway ("in situ"). The conditioning disk has a rough conditioning surface typically comprised of imbedded diamond points that cut microscopic furrows into the pad surface, both abrading and plowing the pad material and renewing the polishing texture. Typically, the conditioning disk is rotated in a position that is fixed with respect to the axis of rotation of the polishing pad, and sweeps out an annular conditioning region as the polishing pad is rotated.

The present invention will now be described in the detail in the following, non-limiting examples.

Unless otherwise stated all temperatures are room temperature (21-23° C.) and all pressures are atmospheric pressure ("760 mm Hg or 101 kPa).

Notwithstanding other raw materials disclosed below, the following raw materials were used in the Examples:

Ethacure™ 300 curative: Dimethylthiotoluenediamine (DMTDA), an aromatic diamine (Albemarle, Charlotte, N.C.).

MDI prepolymer: A linear isocyanate-terminated urethane prepolymer from MDI and the small molecules dipropylene glycol (DPG) and tripropylene glycol (TPG), with ~23 wt. % NCO content and equivalent weight of 182. 100 wt. % of this MDI prepolymer is treated as hard segment.

Niax™ L5345 surfactant: A non-ionic organosilicon surfactant (Momentive, Columbus, Ohio).

INT1940: A fatty acid surfactant (Axel Plastics product Mold Wiz INT-1940®).

PTMEG1000: poly(THF) or polytetramethylene glycol, made via the ring-open polymerization of tetrahydrofuran (THF), and sold as PolyTHF™ polyol (BASF, Leverkusen, Del.). The number following PTMEG is the average molecular weight as reported by the manufacturer.

BiCAT8108: A bismuth neodecanoate catalyst (Shepherd product Bicat 8108).

BiCAT8210: A bismuth octoate catalyst (Shepherd product Bicat 8210).

BiNDE: A bismuth neodecanoate catalyst (Sigma-Aldrich 544132).

MEG: monoethylene glycol (Dow product)

PG: monopropylene glycol (Dow product)

UVX200: A reactive hydroxy phenol benzotriazole ultraviolet light absorber (Milliken product UVX200 HF).

AOX1: A benzofuranone compound, an antioxidant (Milliken product Milliguard AOX-1).

Isonate 181: MDI prepolymer with 23 wt % NCO and an equivalent weight of 182.

CMP polishing pad properties were evaluated according to the following methods:

Hardness: Hardness was measured on a Rex/Hybrid hardness tester with a D probe. Hardness value is the average of six 1.5 in×1.5 in samples measured per pad.

Density: Four 1.5 sq inch samples were used for dimensional density. Sample volume was determined using a Fisher Vernier caliper to measure precise length and width, while a Fowler micrometer was used to measure sample thickness. The weight was measured using an analytical balance.

Polishing Removal Rate: The polishing removal rate experiments were performed on 200 mm blanket S15KTEN TEOS sheet wafers from Novellus Systems, Inc. An Applied Materials 200 mm Mirra® polisher was used. The removal rates were determined by measuring the film thickness before and after polishing using a KLA-Tencor FX200 metrology tool using a 49 point spiral scan with a 3 mm edge exclusion.

Developed interfacial area ratio (Sdr): Sdr was measured using a NanoFocus confocal microscope based on spinning disk confocal microscopy and are reported according to the ISO 25178 standard. Sdr was measured on an uncompressed dry pad surface texture after the polishing experiment. Sdr corresponds to the developed interfacial area ratio (ISO 25178) which is a hybrid parameter that characterizes the complexity of the surface texture. It represents the developed surface area as compared to the projected area and is expressed as the value over 100%.

Preparation of Pads for Testing

The compositions of 18 inventive and comparative pads are summarized in Table 1 below.

TABLE 1

| Examples | mol % diamine in Curative^ | Molar Ratio* | Density (g/mL) | Hardness (Shore D, 2 sec) |
|---|---|---|---|---|
| Comparative Example 1 | 50 | 0.95:1.0 | 0.66 | 37 |
| Example 2 | 50 | 1.03:1.0 | 0.70 | 33 |
| Comparative Example 3 | 100 | 0.95:1.0 | 0.78 | 46 |
| Example 4 | 100 | 1.03:1.0 | 0.79 | 47 |
| Example 5 | 100 | 1.1:1.0 | 0.83 | 46 |
| Comparative Example 6 | 30 | 0.95:1.0 | 0.61 | 33 |
| Example 7 | 30 | 1.1:1.0 | 0.76 | 36 |
| Comparative Example 8 | 100 | 0.95:1.0 | 0.84 | 58 |
| Example 9 | 100 | 1.1:1.0 | 0.84 | 58 |
| Example 10 | 30 | 1.1:1.0 | 0.84 | 52 |
| Example 11 | 50 | 1.03:1.0 | 0.89 | 59 |
| Comparative Example 12 | 30 | 0.95:1.0 | 0.91 | 49 |
| Comparative Example 13 | 30 | 0.95:1.0 | 0.81 | 65 |
| Example 14 | 30 | 1.1:1.0 | 0.75 | 21 |
| Comparative Example 15 | 30 | 0.95:1.0 | 0.73 | 22 |
| Example 16 | 30 | 1.1:1.0 | 0.71 | 17 |
| Comparative Example 17 | 50 | 0.95:1.0 | 0.93 | 57 |
| Example 18 | 50 | 1.1:1.0 | 0.90 | 56 |

^defined as (moles diamine)/(moles of diamine + small chain polyol);
*defined as (moles diamine + hydroxyl)/(moles of isocyanate).

Comparative Example 1: A poly side (P) liquid component was provided, containing 76.7 wt % of a PTMEG with functionality of 2, and equivalent weight of 500 (BASF product PTMEG 1000), 5.2 wt % of monopropylene glycol (Dow product), 14.3 wt % of dimethylthiotoluenediamine curative (Albermarle product Ethacure 300), 1.8 wt % of a non-ionic organosilicon surfactant (Momentive product Niax L5345), 0.2 wt % of bismuth neodecanoate catalyst (Shepherd product Bicat 8108) 1.82 wt % of a reactive hydroxy phenol benzotriazole ultraviolet light absorber (Milliken product UVX200 HF). The mole ratio of liquid aromatic diamine to the total moles of small chain difunctional polyols and liquid aromatic diamine was 50%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 12 g/s. The iso liquid side was fed at a flowrate of 9.9 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 0.95:1.0. A pressurized gas was fed through the four tangential gas feed ports to give a combined liquid component to gas mass flow rate ratio through the axial mixing device of 11.3 to 1 forming a combination. The pad density was 0.66 g/mL and had a hardness of 37 Shore D 2 sec.

Example 2: A poly side (P) liquid component was provided, containing 75.3 wt % of a PTMEG with functionality of 2, and equivalent weight of 500 (BASF product PTMEG 1000), 5.5 wt % of monopropylene glycol (Dow product), 15.4 wt % of dimethylthiotoluenediamine curative (Albermarle product Ethacure 300), 1.8 wt % of a non-ionic organosilicon surfactant (Momentive product Niax L5345), 0.2 wt % of bismuth neodecanoate catalyst (Shepherd product Bicat 8108) 1.79 wt % of a reactive hydroxy phenol benzotriazole ultraviolet light absorber (Milliken product UVX200 HF). The mole ratio of liquid aromatic diamine to the total moles of small chain difunctional polyols and liquid aromatic diamine was 50%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 12.3 g/s. The iso liquid side was fed at a flowrate of 9.7 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.03:1.0. A pressurized gas was fed through the four tangential gas feed ports to give a combined liquid component to gas mass flow rate ratio through the axial mixing device of 11.3 to 1 forming a combination. The pad density was 0.7 g/mL and had a hardness of 33 Shore D 2 sec.

Comparative Example 3: A poly side (P) liquid component was provided, containing 78.2 wt % of a PTMEG with functionality of 2, and equivalent weight of 500 (BASF product PTMEG 1000), 7.8 wt % of monoethylene glycol (Dow product), 11.3 wt % of dimethylthiotoluenediamine curative (Albermarle product Ethacure 300), 1.9 wt % of a non-ionic organosilicon surfactant (Momentive product Niax L5345), 0.81 wt % of bismuth neodecanoate catalyst (Sigma-Aldrich 544132). The mole ratio of liquid aromatic diamine to the total moles of small chain difunctional polyols and liquid aromatic diamine was 100%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 11.9 g/s. The iso liquid side was fed at a flowrate of 10.1 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 0.95:1.0. A pressurized gas was fed through the four tangential gas feed ports to give a combined liquid component to gas mass flow rate ratio through the axial mixing device of 11.4 to 1 forming a combination. The pad density was 0.78 g/mL and had a hardness of 46 Shore D 2 sec.

Example 4: A poly side (P) liquid component was provided, containing 71.9 wt % of a PTMEG with functionality of 2, and equivalent weight of 500 (BASF product PTMEG 1000), 26 wt % of dimethylthiotoluenediamine curative (Albermarle product Ethacure 300), 1.7 wt % of a non-ionic organosilicon surfactant (Momentive product Niax L5345), 0.34 wt % of bismuth neodecanoate catalyst (Shepherd product Bicat 8108). The mole ratio of liquid aromatic diamine to the total moles of small chain difunctional polyols and liquid aromatic diamine was 100%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 12.9 g/s. The iso liquid side was fed at a flowrate of 8.9 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.03:1.0. A pressurized gas was fed through the four tangential gas feed ports to give a combined liquid component to gas mass flow rate ratio through the axial mixing device of 11.3 to 1 forming a combination. The pad density was 0.79 g/mL and had a hardness of 47 Shore D 2 sec.

Example 5: A poly side (P) liquid component was provided, containing 70.7 wt % of a PTMEG with functionality of 2, and equivalent weight of 500 (BASF product PTMEG 1000), 27.3 wt % of dimethylthiotoluenediamine curative (Albermarle product Ethacure 300), 1.7 wt % of a non-ionic organosilicon surfactant (Momentive product Niax L5345), 0.33 wt % of bismuth neodecanoate catalyst (Shepherd product Bicat 8108). The mole ratio of liquid aromatic diamine to the total moles of small chain difunctional polyols and liquid aromatic diamine was 100%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 13.2 g/s. The iso liquid side was fed at a flowrate of 8.8 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.1:1.0. A pressurized gas was fed through the four tangential gas feed ports to give a combined liquid component to gas mass flow rate ratio through the axial mixing device of 11.3 to 1 forming a combination. The pad density was 0.83 g/mL and had a hardness of 46 Shore D 2 sec.

Comparative Example 6: A poly side (P) liquid component was provided, containing 78.4 wt % of a PTMEG with functionality of 2, and equivalent weight of 500 (BASF product PTMEG 1000), 7.8 wt % of monoethylene glycol (Dow product), 11.4 wt % of dimethylthiotoluenediamine curative (Albermarle product Ethacure 300), 2 wt % of a non-ionic organosilicon surfactant (Momentive product Niax L5345), 0.51 wt % of bismuth neodecanoate catalyst (Shepherd product Bicat 8108). The mole ratio of liquid aromatic diamine to the total moles of small chain difunctional polyols and liquid aromatic diamine was 30%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 20.1 g/s. The iso liquid side was fed at a flowrate of 19.9 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 0.95:1.0. A pressurized gas was fed through the four tangential gas feed ports to give a combined liquid component to gas mass flow rate ratio through the axial mixing device of 16.9 to 1 forming a combination. The pad density was 0.61 g/mL and had a hardness of 33 Shore D 2 sec.

Example 7: A poly side (P) liquid component was provided, containing 76.3 wt % of a PTMEG with functionality of 2, and equivalent weight of 500 (BASF product PTMEG 1000), 8.6 wt % of monoethylene glycol (Dow product), 12.7 wt % of dimethylthiotoluenediamine curative (Albermarle product Ethacure 300), 1.9 wt % of a non-ionic organosilicon surfactant (Momentive product Niax L5345), 0.43 wt % of bismuth neodecanoate catalyst (Sigma-Aldrich 544132). The mole ratio of liquid aromatic diamine to the total moles of small chain difunctional polyols and liquid aromatic diamine was 30%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 10.1 g/s. The iso liquid side was fed at a flowrate of 9.4 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.1:1.0. A pressurized gas was fed through the four tangential gas feed ports to give a combined liquid component to gas mass flow rate ratio through the axial mixing device of 10.1 to 1 forming a combination. The pad density was 0.76 g/mL and had a hardness of 36 Shore D 2 sec.

Comparative Example 8: A poly side (P) liquid component was provided, containing 66.7 wt % of a PTMEG with functionality of 2, and equivalent weight of 500 (BASF product PTMEG 1000), 31.2 wt % of dimethylthiotoluenediamine curative (Albermarle product Ethacure 300), 1.8 wt % of a non-ionic organosilicon surfactant (Momentive product Niax L5345), 0.27 wt % of bismuth neodecanoate catalyst (Shepherd product Bicat 8108). The mole ratio of liquid aromatic diamine to the total moles of small chain difunctional polyols and liquid aromatic diamine was 100%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 12.1 g/s. The iso liquid side was fed at a flowrate of 10 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 0.95:1.0. A pressurized gas was fed through the four tangential gas feed ports to give a combined liquid component to gas mass flow rate ratio through the axial mixing device of 11.4 to 1 forming a combination. The pad density was 0.84 g/mL and had a hardness of 58 Shore D 2 sec.

Example 9: A poly side (P) liquid component was provided, containing 63.9 wt % of a PTMEG with functionality of 2, and equivalent weight of 500 (BASF product PTMEG 1000), 34.1 wt % of dimethylthiotoluenediamine curative (Albermarle product Ethacure 300), 1.7 wt % of a non-ionic organosilicon surfactant (Momentive product Niax L5345), 0.26 wt % of bismuth neodecanoate catalyst (Shepherd product Bicat 8108). The mole ratio of liquid aromatic diamine to the total moles of small chain difunctional polyols and liquid aromatic diamine was 100%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 12.6 g/s. The iso liquid side was fed at a flowrate of 9.4 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.1:1.0. A pressurized gas was fed through the four tangential gas feed ports to give a combined liquid component to gas mass flow rate ratio through the axial mixing device of 11.4 to 1 forming a combination. The pad density was 0.84 g/mL and had a hardness of 58 Shore D 2 sec.

Example 10: A poly side (P) liquid component was provided, containing 80.8 wt % of a PTMEG with functionality of 2, and equivalent weight of 500 (BASF product PTMEG 1000), 6.8 wt % of monoethylene glycol (Dow product), 9.9 wt % of dimethylthiotoluenediamine curative (Albermarle product Ethacure 300), 1.8 wt % of a non-ionic organosilicon surfactant (Momentive product Niax L5345), 0.78 wt % of bismuth neodecanoate catalyst (Sigma-Aldrich 544132). The mole ratio of liquid aromatic diamine to the total moles of small chain difunctional polyols and liquid aromatic diamine was 30%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 12.2 g/s. The iso liquid side was fed at a flowrate of 9.5 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.1:1.0. A pressurized gas was fed through the four tangential gas feed ports to give a combined liquid component to gas mass flow rate ratio through the axial mixing device of 11.2 to 1 forming a combination. The pad density was 0.84 g/mL and had a hardness of 52 Shore D 2 sec.

Example 11: A poly side (P) liquid component was provided, containing 71 wt % of a PTMEG with functionality of 2, and equivalent weight of 500 (BASF product PTMEG 1000), 6 wt % of monoethylene glycol (Dow product), 20.6 wt % of dimethylthiotoluenediamine curative (Albermarle product Ethacure 300), 1.9 wt % of a non-ionic organosilicon surfactant (Momentive product Niax L5345), 0.39 wt % of bismuth neodecanoate catalyst (Shepherd product Bicat 8108). The mole ratio of liquid aromatic diamine to the total moles of small chain difunctional polyols and liquid aromatic diamine was 50%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 11.3 g/s. The iso liquid side was fed at a flowrate of 10.7 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.03:1.0. A pressurized gas was fed through the four tangential gas feed ports to give a combined liquid component to gas mass flow rate ratio through the axial mixing device of 11.3 to 1 forming a combination. The pad density was 0.89 g/mL and had a hardness of 59 Shore D 2 sec.

Comparative Example 12: A poly side (P) liquid component was provided, containing 78.4 wt % of a PTMEG with functionality of 2, and equivalent weight of 500 (BASF product PTMEG 1000), 7.8 wt % of monoethylene glycol (Dow product), 11.4 wt % of dimethylthiotoluenediamine curative (Albermarle product Ethacure 300), 2 wt % of a non-ionic organosilicon surfactant (Momentive product Niax L5345), 0.51 wt % of bismuth neodecanoate catalyst (Shepherd product Bicat 8108). The mole ratio of liquid aromatic diamine to the total moles of small chain difunctional polyols and liquid aromatic diamine was 30%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 20.1 g/s. The iso liquid side was fed at a flowrate of 19.9 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 0.95:1.0. A pressurized gas was fed through the four tangential gas feed ports to give a combined liquid component to gas mass flow rate ratio through the axial mixing device of 20.6 to 1 forming a combination. The pad density was 0.91 g/mL and had a hardness of 49 Shore D 2 sec.

Comparative Example 13: A poly side (P) liquid component was provided, containing 81.4 wt % of a PTMEG with functionality of 2, and equivalent weight of 500 (BASF product PTMEG 1000), 6.6 wt % of monoethylene glycol (Dow product), 9.7 wt % of dimethylthiotoluenediamine curative (Albermarle product Ethacure 300), 1.9 wt % of a non-ionic organosilicon surfactant (Momentive product Niax L5345), 0.42 wt % of bismuth neodecanoate catalyst (Sigma-Aldrich 544132). The mole ratio of liquid aromatic diamine to the total moles of small chain difunctional polyols and liquid aromatic diamine was 30%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 11.5 g/s. The iso liquid side was fed at a flowrate of 10.5 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 0.95:1.0. A pressurized gas was fed through the four tangential gas feed ports to give a combined liquid component to gas mass flow rate ratio through the axial mixing device of 11.4 to 1 forming a combination. The pad density was 0.81 g/mL and had a hardness of 65 Shore D 2 sec.

Example 14: A poly side (P) liquid component was provided, containing 77.3 wt % of a PTMEG with functionality of 2, and equivalent weight of 500 (BASF product PTMEG 1000), 7.4 wt % of monoethylene glycol (Dow product), 10.9 wt % of dimethylthiotoluenediamine curative (Albermarle product Ethacure 300), 3.7 wt % of fatty acid surfactant (Axel Plastics product Mold Wiz INT-1940®), 0.41 wt % of bismuth octoate catalyst (Shepherd product Bicat 8210), 0.26 wt % of benzofuranone-compound antioxidant (Milliken product Milliguard AOX-1). The mole ratio of liquid aromatic diamine to the total moles of small chain difunctional polyols and liquid aromatic diamine was 30%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 4.6 g/s. The iso liquid side was fed at a flowrate of 3.9 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.1:1.0. A pressurized gas was fed through the four tangential gas feed ports to give a combined liquid component to gas mass flow rate ratio through the axial mixing device of 4.4 to 1 forming a combination. The pad density was 0.75 g/mL and had a hardness of 21 Shore D 2 sec.

Comparative Example 15: A poly side (P) liquid component was provided, containing 82 wt % of a PTMEG with functionality of 2, and equivalent weight of 500 (BASF product PTMEG 1000), 5.5 wt % of monoethylene glycol (Dow product), 8.2 wt % of dimethylthiotoluenediamine curative (Albermarle product Ethacure 300), 3.6 wt % of fatty acid surfactant (Axel Plastics product Mold Wiz INT-1940®), 0.4 wt % of bismuth octoate catalyst (Shepherd product Bicat 8210), 0.26 wt % of benzofuranone-compound antioxidant (Milliken product Milliguard AOX-1). The mole ratio of liquid aromatic diamine to the total moles of small chain difunctional polyols and liquid aromatic diamine was 30%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 4.6 g/s. The iso liquid side was fed at a flowrate of 3.8 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 0.95:1.0. A pressurized gas was fed through the four tangential gas feed ports to give a combined liquid component to gas mass flow rate ratio through the axial mixing device of 4.3 to 1 forming a combination. The pad density was 0.73 g/mL and had a hardness of 22 Shore D 2 sec.

Example 16: A poly side (P) liquid component was provided, containing 79.8 wt % of a PTMEG with functionality of 2, and equivalent weight of 500 (BASF product PTMEG 1000), 6.5 wt % of monoethylene glycol (Dow product), 9.6 wt % of dimethylthiotoluenediamine curative (Albermarle product Ethacure 300), 3.6 wt % of fatty acid surfactant (Axel Plastics product Mold Wiz INT-1940®), 0.39 wt % of bismuth octoate catalyst (Shepherd product Bicat 8210), 0.25 wt % of benzofuranone-compound antioxidant (Milliken product Milliguard AOX-1). The mole ratio of liquid aromatic diamine to the total moles of small chain difunctional polyols and liquid aromatic diamine was 30%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 4.6 g/s. The iso liquid side was fed at a flowrate of 3.6 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.1:1.0. A pressurized gas was fed through the four tangential gas feed ports to give a combined liquid component to gas mass flow rate ratio through the axial mixing device of 4.2 to 1 forming a combination. The pad density was 0.71 g/mL and had a hardness of 17 Shore D 2 sec.

Comparative Example 17: A poly side (P) liquid component was provided, containing 72.6 wt % of a PTMEG with functionality of 2, and equivalent weight of 500 (BASF product PTMEG 1000), 5.7 wt % of monoethylene glycol (Dow product), 19.4 wt % of dimethylthiotoluenediamine curative (Albermarle product Ethacure 300), 2 wt % of a non-ionic organosilicon surfactant (Momentive product Niax L5345), 0.3 wt % of bismuth neodecanoate catalyst (Shepherd product Bicat 8108). The mole ratio of liquid aromatic diamine to the total moles of small chain difunctional polyols and liquid aromatic diamine was 50%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 20.2 g/s. The iso liquid side was fed at a flowrate of 19.9 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 0.95:1.0. A pressurized gas was fed through the four tangential gas feed ports to give a combined liquid component to gas mass flow rate ratio through the axial mixing device of 16.9 to 1 forming a combination. The pad density was 0.93 g/mL and had a hardness of 57 Shore D 2 sec.

Example 18: A poly side (P) liquid component was provided, containing 69.8 wt % of a PTMEG with functionality of 2, and equivalent weight of 500 (BASF product PTMEG 1000), 6.3 wt % of monoethylene glycol (Dow product), 21.6 wt % of dimethylthiotoluenediamine curative (Albermarle product Ethacure 300), 1.9 wt % of a non-ionic organosilicon surfactant (Momentive product Niax L5345), 0.38 wt % of bismuth neodecanoate catalyst (Shepherd product Bicat 8108). The mole ratio of liquid aromatic diamine to the total moles of small chain difunctional polyols and liquid aromatic diamine was 50%. An Iso side (I) liquid component was provided composed of MDI prepolymer with 23 wt % NCO and equivalent weight of 182. The 2-component mixing device was employed to combine both liquid feeds and discharge the liquid component into an open template. The poly liquid side with the composition described above was fed at a flowrate of 11.5 g/s. The iso liquid side was fed at a flowrate of 10.5 g/s. The mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer was 1.1:1.0. A pressurized gas was fed through the four tangential gas feed ports to give a combined liquid component to gas mass flow rate ratio through the axial mixing device of 11.3 to 1 forming a combination. The pad density was 0.9 g/mL and had a hardness of 56 Shore D 2 sec.

Polishing Tests—Conducted Using the Above Inventive and Comparative Pads

Comparative Example 19: The polishing layer in the Comparative Example 1 was first machined flat using a lathe. The polishing layer with a K7 R32 (DuPont) groove pattern was then stacked onto a Suba IV (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes and an additional break in step using a Saesol™ AM02BSL1421E4 diamond conditioner using a downforce of 7 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 1836 A/min at 3 psi. The post-polishing resulting surface texture of the polishing layer had a Sdr of 17%.

Example 20: The polishing layer in the Example 2 was first machined flat using a lathe. The polishing layer with a K7 R32 (DuPont) groove pattern was then stacked onto a Suba IV (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes and an additional break in step using a Saesol™ AM02BSL1421E4 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 4434 A/min at 3 psi. The post-polishing resulting surface texture of the polishing layer had a Sdr of 33%.

Comparative Example 21: The polishing layer in the Comparative Example 3 was first machined flat using a lathe. The polishing layer with a K7 R32 (DuPont) groove pattern was then stacked onto a Suba IV (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes and an additional break in step using a Saesol™ AM02BSL1421E4 diamond conditioner using a downforce of 7 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 2198 A/min at 3 psi. The post-polishing resulting surface texture of the polishing layer had a Sdr of 48%.

Example 22: The polishing layer in the Example 4 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 45 minutes and an additional break in step using a Saesol™ AM02BSL1421E4 diamond conditioner using a downforce of 9 lb for 30 minutes. A Saesol™

AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401:STI2910 (60:240 mass ratio). The removal rate of the polishing pad was 2800 A/min at 3 psi. The post-polishing resulting surface texture of the polishing layer had a Sdr of 18%.

Example 23: The polishing layer in the Example 5 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 45 minutes and an additional break in step using a Saesol™ AM02BSL1421E4 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 3100 A/min at 3 psi. The post-polishing resulting surface texture of the polishing layer had a Sdr of 17%.

Comparative Example 24: The polishing layer in the Comparative Example 3 was first machined flat using a lathe. The polishing layer with a K7 R32 (DuPont) groove pattern was then stacked onto a Suba IV (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2291 A/min at 3 psi. The post-polishing resulting surface texture of the polishing layer had a Sdr of 48%.

Comparative Example 25: The polishing layer in the Example 5 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2279 A/min at 3 psi. The post-polishing resulting surface texture of the polishing layer had a Sdr of 17%.

Comparative Example 26: The polishing layer in the Comparative Example 6 was first machined flat using a lathe. The polishing layer with a K7 R32 (DuPont) groove pattern was then stacked onto a Suba IV (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes and an additional break in step using a Saesol™ AM02BSL1421E4 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 1072 A/min at 3 psi. The post-polishing resulting surface texture of the polishing layer had a Sdr of 48%.

Example 27: The polishing layer in the Example 7 was first machined flat using a lathe. The polishing layer was pre-conditioned to have an effective pad surface texture using a rotary grinder. The polishing layer with a K7 R32 (DuPont) groove pattern was then stacked onto a Suba IV (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL1421E4 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 3977 A/min at 3 psi. The post-polishing resulting surface texture of the polishing layer had a Sdr of 29%.

Comparative Example 28: The polishing layer in the Comparative Example 12 was first machined flat using a lathe. The polishing layer with a K7 R32 (DuPont) groove pattern was then stacked onto a Suba IV (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2431 A/min at 3 psi. The post-polishing resulting surface texture of the polishing layer had a Sdr of 48%.

Comparative Example 29: The polishing layer in the Example 7 was first machined flat using a lathe. The polishing layer with a K7 R32 (DuPont) groove pattern was then stacked onto a Suba IV (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2293 A/min at 3 psi. The post-polishing resulting surface texture of the polishing layer had a Sdr of 29%.

Comparative Example 30: The polishing layer in the Comparative Example 8 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 45 minutes and an additional break in step using a Saesol™ AM02BSL1421E4 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 2300 A/min at 3 psi. The post-polishing resulting surface texture of the polishing layer had a Sdr of 18%.

Example 31: The polishing layer in the Example 9 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 45 minutes and an additional break in step using a Saesol™ AM02BSL1421E4 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 2900 A/min at 3 psi. The post-polishing resulting surface texture of the polishing layer had a Sdr of 11%.

Comparative Example 32: The polishing layer in the Comparative Example 8 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2322 A/min at 3 psi. The post-polishing resulting surface texture of the polishing layer had a Sdr of 18%.

Comparative Example 33: The polishing layer in the Example 9 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2410 A/min at 3 psi. The post-polishing resulting surface texture of the polishing layer had a Sdr of 11%.

Comparative Example 34: The polishing layer in the Comparative Example 13 was first machined flat using a lathe. The polishing layer with a K7 R32 (DuPont) groove pattern was then stacked onto a SP 2310 (DuPont) subpad with a reactive hot melt adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes. A Saesol™ AM02BSL8031C1 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2580 A/min at 3 psi.

Comparative Example 35: The polishing layer in the Example 14 was first machined flat using a lathe. The polishing layer with a K7 R32 (DuPont) groove pattern was then stacked onto a FSP 350 (DuPont) subpad with a reactive hot melt adhesive. The polishing layer was mounted on the platen of a 200 mm Mirra™ polisher (Applied Materials, Santa Clara, Calif.). The polishing layer was broken in with a Saesol™ AM02BSL8031E7 diamond conditioner using a downforce of 9 lb for 30 minutes. A Saesol™ AM02BSL8031E7 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2093 A/min at 3 psi. The post-polishing resulting surface texture of the polishing layer had a Sdr of 32%.

Example 36: The polishing layer in the Example 10 was first machined flat using a lathe. The polishing layer was pre-conditioned to have an effective pad surface texture using a rotary grinder. The polishing layer with a K7 R32 (DuPont) groove pattern was then stacked onto a Suba IV (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL1421E4 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 4349 A/min at 3 psi. The post-polishing resulting surface texture of the polishing layer had a Sdr of 10%.

Comparative Example 37: The polishing layer in the Comparative Example 15 was first machined flat using a lathe. The polishing layer with a K7 R32 (DuPont) groove pattern was then stacked onto a FSP 350 (DuPont) subpad with a reactive hot melt adhesive. The polishing layer was mounted on the platen of a 200 mm Mirra™ polisher (Applied Materials, Santa Clara, Calif.). The polishing layer was broken in with a Saesol™ AM02BSL8031E7 diamond conditioner using a downforce of 9 lb for 30 minutes. A Saesol™ AM02BSL8031E7 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 1969 A/min at 3 psi. The post-polishing resulting surface texture of the polishing layer had a Sdr of 20%.

Comparative Example 38: The polishing layer in the Example 16 was first machined flat using a lathe. The polishing layer with a K7 R32 (DuPont) groove pattern was then stacked onto a FSP 350 (DuPont) subpad with a reactive hot melt adhesive. The polishing layer was mounted on the platen of a 200 mm Mirra™ polisher (Applied Materials, Santa Clara, Calif.). The polishing layer was broken in with a Saesol™ AM02BSL8031E7 diamond conditioner using a downforce of 9 lb for 30 minutes. A Saesol™ AM02BSL8031E7 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 1741 A/min at 3 psi. The post-polishing resulting surface texture of the polishing layer had a Sdr of 23%.

Example 39: The polishing layer in the Example 11 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 45 minutes and an additional break in step using a Saesol™ AM02BSL1421E4 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Versum Materials Slurry blend STI2401 and STI2910 (60:240 mass ratio). The removal rate of the polishing pad was 3000 A/min at 3 psi. The post-polishing resulting surface texture of the polishing layer had a Sdr of 18%.

Comparative Example 40: The polishing layer in the Comparative Example 17 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2213 A/min at 3 psi. The post-polishing resulting surface texture of the polishing layer had a Sdr of 14%.

Comparative Example 41: The polishing layer in the Example 18 was first machined flat using a lathe. The polishing layer with a K7 R32 (DuPont) groove pattern was then stacked onto a SP 2150 (DuPont) subpad with a pressure sensitive adhesive. The polishing layer was mounted on the platen of a 200 mm Mirra™ polisher (Applied Materials, Santa Clara, Calif.). The polishing layer was broken in with a Saesol™ AM02BSL8031C1 diamond conditioner using a downforce of 9 lb for 30 minutes. A Saesol™ AM02BSL1421E4 diamond pad conditioner was used to condition the pad 100% in situ during polishing with a downforce of 7 lb. Polishing was carried out at a 0.02 MPa downforce, with a table rotation speed of 93 rpm, a carrier rotation speed of 87 rpm and a slurry flow of 200 mL/min. The slurry used in the polishing experiment was Klebosol™ 1730 silica slurry (DuPont). The removal rate of the polishing pad was 2532 A/min at 3 psi. The post-polishing resulting surface texture of the polishing layer had a Sdr of 14%.

The results of the polishing tests, Examples and Comparative Examples 19-41, are summarized in Table 2 below.

Example pairs Comparative Example 19/Example 20, Comparative Example 21/Examples 22 and 23, Comparative Example 26/Example 27, Comparative Example 30/Example 31 show that the polishing pads made from compositions having molar ratios, defined as (moles diamine and hydroxyl)/(moles of isocyanate), in the range from 1.0:1.0 to 1.15:1.0, provided superior removal rates when using ceria as the slurry abrasive.

Example pairs Comparative Example 24/Comparative Example 25, Comparative Example 28/Comparative Example 29, Comparative Example 32/Comparative Example 33, Comparative Example 34/Comparative Example 35, Comparative Example 37/Comparative Example 38, Comparative Example 40/Comparative Example 41 show that the polishing pads made from compositions having molar ratios, defined as (moles diamine and hydroxyl)/(moles of isocyanate), in the range from 1.0:1.0 to 1.15:1.0, did not provide superior removal rates when using silica as the slurry abrasive.

Additionally, example pairs Example 36/Comparative Example 38, and Example 39/Comparative Example 41 show the surprising results that using ceria as the slurry abrasive is far more beneficial than using silica as the slurry abrasive in improving removal rates with the polishing pads made from compositions having molar ratios, defined as (moles diamine and hydroxyl)/(moles of isocyanate), in the range from 1.0:1.0 to 1.15:1.0

TABLE 2

| Polishing Test Examples | Polishing Test Examples | Slurry Abrasive Type | TEOS RR @ 3 psi (A/min) | Sdr |
|---|---|---|---|---|
| Comparative Example 19 | Comparative Example 1 | Ceria | 1836 | 17% |
| Example 20 | Example 2 | Ceria | 4434 | 33% |
| Comparative Example 21 | Comparative Example 3 | Ceria | 2198 | 48% |
| Example 22 | Example 4 | Ceria | 2800 | 18% |
| Example 23 | Example 5 | Ceria | 3100 | 17% |
| Comparative Example 24 | Comparative Example 3 | Silica | 2291 | 48% |
| Comparative Example 25 | Example 5 | Silica | 2279 | 17% |
| Comparative Example 26 | Comparative Example 6 | Ceria | 1072 | 48% |
| Example 27 | Example 7 | Ceria | 3977 | 29% |
| Comparative Example 28 | Comparative Example 12 | Silica | 2431 | 48% |
| Comparative Example 29 | Example 7 | Silica | 2293 | 29% |
| Comparative Example 30 | Comparative Example 8 | Ceria | 2300 | 18% |
| Example 31 | Example 9 | Ceria | 2900 | 11% |
| Comparative Example 32 | Comparative Example 8 | Silica | 2322 | 18% |
| Comparative Example 33 | Example 9 | Silica | 2410 | 11% |
| Comparative Example 34 | Comparative Example 13 | Silica | 2580 | — |
| Comparative Example 35 | Example 14 | Silica | 2093 | 32% |
| Example 36 | Example 10 | Ceria | 4349 | 10% |
| Comparative Example 37 | Comparative Example 15 | Silica | 1969 | 20% |
| Comparative Example 38 | Example 16 | Silica | 1741 | 23% |
| Example 39 | Example 11 | Ceria | 3000 | 18% |
| Comparative Example 40 | Comparative Example 17 | Silica | 2213 | 14% |
| Comparative Example 41 | Example 18 | Silica | 2532 | 14% |

We claim:

1. A method of chemical mechanical polishing a substrate, comprising:
   providing the substrate;
   providing a polishing slurry comprising water and a ceria abrasive;
   providing a polishing pad comprising a polishing layer having a composition, and a polishing surface, wherein the composition is a reaction product of ingredients, comprising: (i) a liquid aromatic isocyanate component comprising one or more aromatic diisocyanates or a linear aromatic isocyanate-terminated urethane prepolymer having an unreacted isocyanate (NCO) concentration of from 20 to 40 wt. %, based on the total solids weight of the liquid aromatic isocyanate component, and (ii) a liquid polyol component comprising a) one or more polymeric polyols, and b) from 12 to 40 wt. %, based on the total weight of the liquid polyol component, of a curative mixture of one or more small chain difunctional polyols having from 2 to 9 carbon atoms, and a liquid aromatic diamine which is a liquid under ambient conditions, wherein the mole ratio of liquid aromatic diamine to the total moles of small chain difunctional polyols and liquid aromatic diamine ranges from 15:85 to 50:50, and wherein the mole ratio of the total moles of hydroxyl and amino moieties in the liquid polyol, small chain difunctional polyols and liquid aromatic diamine to mole of isocyanate in the aromatic diisocyanates or linear aromatic isocyanate-terminated urethane prepolymer ranges from 1.0:1.0 to 1.1:1.0, the reaction mixture comprises 48 to 68 wt. % of hard segment materials, based on the total weight of the reaction mixture, and, yet still further wherein, the CMP polishing layer has a hardness in the range of from 54 Shore A (2 second) to 72 Shore D (2 second), and a density of from 0.45 to 0.99 g/mL;
   creating a dynamic motion between the polishing surface and the substrate to polish a surface of the substrate; and
   dispensing the polishing slurry onto the chemical mechanical polishing pad at or near the interface between the polishing surface and the substrate.

2. The method as claimed in claim 1, wherein the (i) liquid aromatic isocyanate component comprises a linear methylene diphenyl diisocyanate (MDI) prepolymer or MDI.

3. The method as claimed in claim 1, wherein the (ii) liquid polyol component comprises a) one or more polymeric polyols which is selected from the group consisting of polytetramethylene glycol (PTMEG), polypropylene glycol (PPG), a hexafunctional polyol, and mixtures thereof.

4. The method as claimed in claim 1, wherein in the b) curative mixture of the (ii) liquid polyol component, the one or more small chain difunctional polyols having from 2 to 9 carbon atoms is selected from the group consisting of ethylene glycol, 1,2-propylene glycol, 1,3-propylene glycol, 1,2-butanediol, 1,3-butanediol, 2-methyl-1, 3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol, and mixtures thereof.

5. The method as claimed in claim 1, wherein in the b) curative mixture, the liquid aromatic diamine is selected from the group consisting of dimethylthio-toluene diamines, diethyl toluene diamines, tert-butyl toluene diamines, chlorotoluenediamines, N,N'-dialkylaminodiphenylmethane, and mixtures thereof.

6. The method as claimed in claim 1, wherein in the b) curative mixture, the mole ratio of liquid aromatic diamine to the total moles of small chain difunctional polyols and liquid aromatic diamine ranges from 23:77 to 35:65.

7. The method as claimed in claim 1, wherein the reaction mixture comprises from 58 to 63 wt. % of hard segment materials, based on the total weight of the reaction mixture.

8. The method as claimed in claim 1, wherein the CMP polishing pad contains no microelements other than those formed by gas, water or $CO_2$-amine adduct.

9. The method as claimed in claim 1, wherein the polishing layer is capable of forming a total texture depth, as measured by Sdr, a parameter defined by the ISO 25178 standard, upon treatment by a surface conditioning disk, in the range of from 0 to 0.4.

10. The method as claimed in claim 9, wherein the polishing layer is capable of forming a total texture depth, as measured by Sdr, a parameter defined by the ISO 25178 standard, upon treatment by a surface conditioning disk, in the range of from 0.1 to 0.3.

\* \* \* \* \*